United States Patent [19]

Lauscher

[11] Patent Number: 5,570,767
[45] Date of Patent: Nov. 5, 1996

[54] DRUM MEMBER HAVING TOOTH SYSTEM FOR RECEIVING MULTIPLE DISCS

[75] Inventor: Friedel Lauscher, Kreuzau-Drove, Germany

[73] Assignee: Ford Motor Company, Dearborn, Mich.

[21] Appl. No.: 434,216

[22] Filed: May 4, 1995

[30] Foreign Application Priority Data

May 28, 1994 [DE] Germany .......................... 44 18 694.0

[51] Int. Cl.$^6$ .............................. F16D 13/68; F16D 13/72
[52] U.S. Cl. ................ 192/70.12; 192/70.2; 192/113.34
[58] Field of Search ............................... 192/70.12, 70.2, 192/113.34

[56] References Cited

U.S. PATENT DOCUMENTS

| 4,566,571 | 1/1986 | Fujioka | 192/70.2 |
| 5,230,411 | 7/1993 | Nishida et al. | |

FOREIGN PATENT DOCUMENTS

| 0310328 | 9/1988 | European Pat. Off. | |
| 2292894 | 6/1976 | France | 192/70.2 |
| 858343 | 8/1949 | Germany | |
| 57-154522 | 9/1982 | Japan | 192/70.12 |
| 4-69412 | 3/1992 | Japan | 192/113.34 |
| 4-125317 | 4/1992 | Japan | 192/70.2 |

OTHER PUBLICATIONS

Patent Abstracts of Japan, M–1485, vol. 17/No. 530, Sep. 24, 1993.
Patent Abstracts of Japan, M–1296, vol. 16/No. 384, Aug. 17, 1992.

*Primary Examiner*—Richard M. Lorence
*Attorney, Agent, or Firm*—Frank G. McKenzie

[57] ABSTRACT

In a drum member (1) having a tooth system (6) for receiving multiple discs (7), which is formed as a one-piece, cold-worked sheen steel member and which, on at least one tooth system of an internal and/or an external tooth system, is provided on part of the tooth system (6) with longitudinally extending recesses (22) of V-shaped cross section, formed during manufacture, for the removal of lubricating and cooling medium, the part of the tooth system (6) on which the longitudinally extending recesses (22) are formed is the foot or the base of the tooth gap.

3 Claims, 1 Drawing Sheet

DRUM MEMBER HAVING TOOTH SYSTEM FOR RECEIVING MULTIPLE DISCS

BACKGROUND OF THE INVENTION

1. Field of the Invention

The invention relates to a drum member with a tooth system for receiving multiple discs, which is formed as a one-piece, cold-worked sheet steel member.

2. Description of the Prior Art

French Patent Specification 2 292 894 describes a drum member having a tooth system for receiving multiple discs, the drum being formed in one-piece of cold-worked steel and, on at least one tooth system of an internal and/or an external tooth system, is provided on part of the tooth system with longitudinally extending recesses of V-shaped cross section, formed during manufacture, which facilitate the supply of lubricating and cooling medium to and its removal from the multiple discs.

In the case of this known drum member having a tooth system for receiving multiple discs, the drum member is provided with both an external and internal tooth system and accordingly can cooperate both on the inner and outer circumference with corresponding multiple discs of a multiplate clutch.

SUMMARY OF THE INVENTION

It is an object of the present invention to provide an improved drum member with a tooth system for receiving multiple discs, of the kind referred to above, in which, even in the case of a drum member without an external tooth system, the supply of lubricating and cooling medium to and its removal from the multiple discs on the internal tooth system cooperating with the multiple discs is optimized. In the drum member of this invention, the outer circumference is in the form of a cylinder, which cooperates in a known manner with a brake band wrapped around this drum member.

To this end, in accordance with this invention, in a drum member having a tooth system for receiving multiple discs, which is formed as a one-piece, cold-worked sheet steel member and which, on at least one tooth system of an internal and/or an external tooth system, is provided on part of the tooth system with longitudinally extending recesses of V-shaped cross section, formed during manufacture, for the removal of lubricating and cooling medium, the part of the tooth system on which the longitudinally extending V-shaped recesses are formed is the foot or the base of the tooth gap.

In an advantageous embodiment of this invention, an annular groove for a securing ring, for securing an end disc, is machined into the inner circumference of the tooth system in known manner, but with the diameter of the base of the groove intersecting the V-shaped recesses.

Making the part of the tooth system on which the longitudinally extending recesses are formed, the foot or the base of the tooth gap ensures that the lubricating and cooling medium, which collects at the radially outermost positions through centrifugal force, can be completely removed.

Machining the annular groove for a securing ring, provided in a known manner in the end region of the tooth system, so that the diameter of the base of the groove intersects the V-shaped recesses at the base of the tooth gap, substantially reduces burr formation when machining the annular groove, whereby the operations for removal of machining burrs can be simplified.

DESCRIPTION OF THE PREFERRED EMBODIMENT

Figure 1:
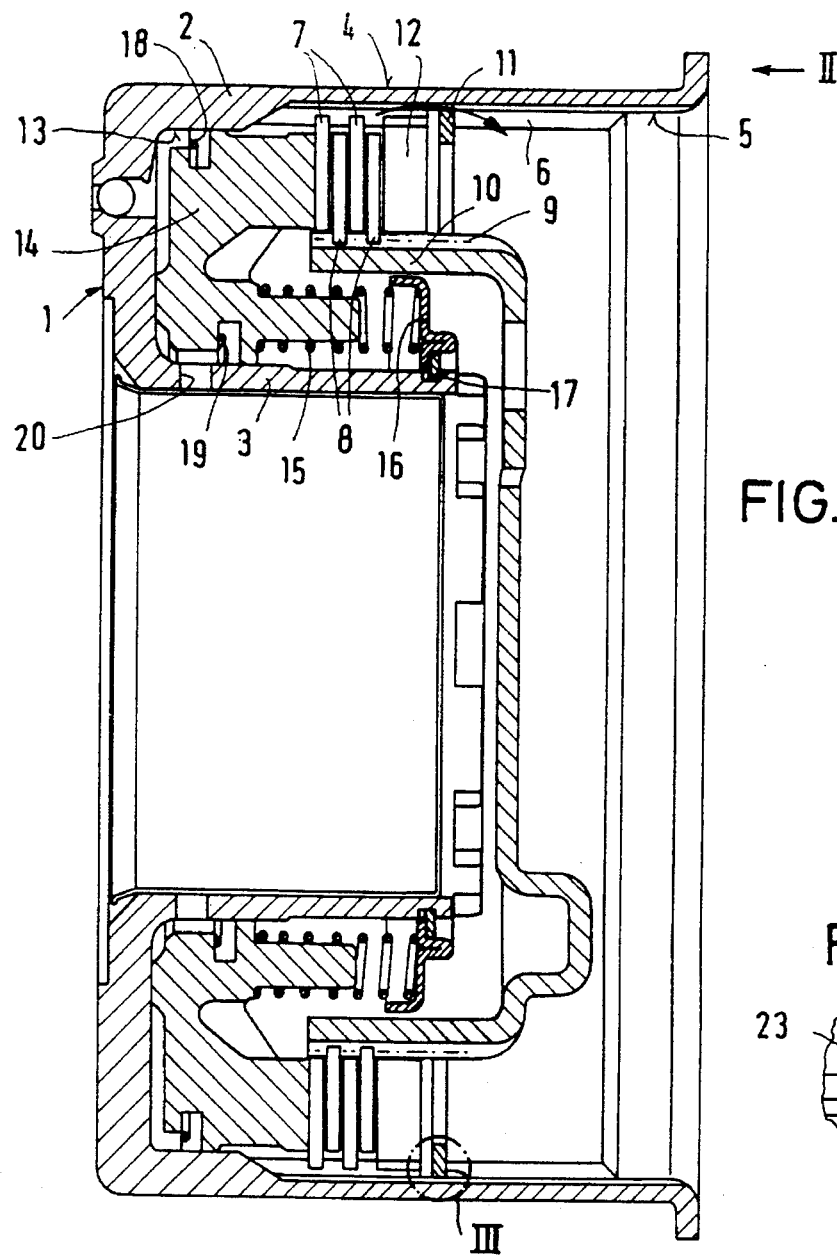
FIG. 1 is a vertical cross section through a drum member, in accordance with the invention, in which multiple discs and an annular piston acting on the discs are shown.
Figure 3:
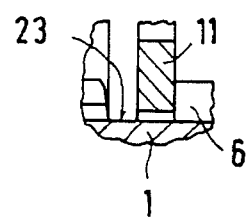
FIG. 3 is an enlarged view of the region in the circle III in FIG. 1.

In FIG. 1, a drum member 1 with a cylindrical outer part 2 and a cylindrical inner part 3 is formed as a one-piece, cold-worked sheet steel member.

The outer part 2 can cooperate, with its outer cylindrical surface 4, with a brake band (not shown) of an automatic transmission. The inner circumference 5 of the outer part 2 is provided with a tooth system 6, which receives a multiple-disc unit of a multiplate clutch of an automatic transmission. The multiple-disc unit comprises a number of outer discs 7, which are received nonrotatably in the tooth system 6 through corresponding lugs, and a number of inner discs 8, which are connected nonrotatably through corresponding lugs to the tooth system 9 of a further drum member 10.

The multiple-disc units 7 and 8 can be acted on between an end disc 12, fixed to the tooth system 6 through a securing ring 11 and an annular piston 14 arranged in the annular cylinder 13 formed by the inner end section of the drum member 1, by application of hydraulic pressure.

The annular piston 14 is returned to its release position by a return spring 15, of which the spring cup 16 is supported on the inner part 3 of the drum member 1 and fixed against displacement by snap ring 17.

The annular piston 14 is provided in the usual way with sealing rings 18 and 19 and the annular cylinder 13 with a pressure medium supply duct 20.

The structure so far described, of a drum member with a tooth system for receiving multiple discs of a multiplate clutch of an automatic transmission, is essentially well known.

To produce adequate lubrication and cooling, lubricating and cooling medium must be supplied to the multiple-disc unit 7 and 8, and this is effected by the lubricant charge present in the automatic transmission. The centrifugal force acting on the lubricant causes the lubricant supplied to collect in the region of the tooth system 6. In the event that the end disc 12 and the securing ring 11 do not provide for adequate through-flow, this can lead to a back pressure which impairs uniform engagement of the multiple-disc unit 7 and 8.

According to this invention, therefore, the tooth system 6 is formed in a special way, as will be explained in more detail in connection with FIG. 2.

Figure 2:
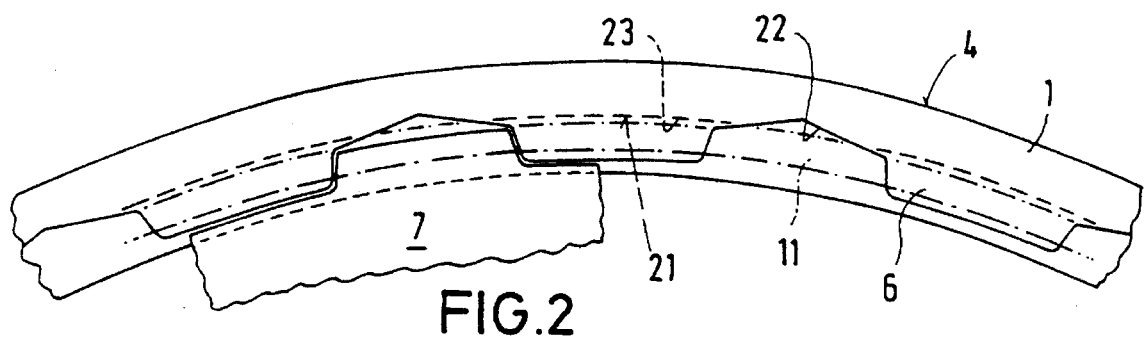
FIG. 2 is an enlarged view in the direction of the arrow II in FIG. 1.

FIG. 2 shows an enlarged view in the direction of the arrow II in FIG. 1, the securing ring 11 being indicated by chain lines and the annular groove 21, which receives the securing ring 11, being drawn in broken lines.

The tooth system 6, in the form of an internal tooth system, is formed in known manner as an involute tooth system, but, in accordance with this invention, with the foot or base 22 of the tooth gap departing from the usual form by being provided with a longitudinally extending V-shaped recess 22. The base 23 of the annular groove 21 for the securing ring 11 lies at a depth such that it intersects the V-shaped recesses 22.

As can be seen from the disc 7, shown in cross section in the left half of FIG. 2, a space substantially triangular in cross-section remains between the lugs of the multiple-disc 7 and the gaps in the tooth system in which they engage. This serves for the removal of the cooling and lubricating medium.

By forming the tooth gaps of the tooth system with a longitudinally extending V-shaped recess 22, not only is removal of cooling and lubricating medium assured, but also, in the manufacture of the drum member, which is performed using a known metal spinning process, better shaping of the tooth system 6 is achieved, as the V-shaped form of the base of the foot or of the tooth gap 22 gives better flow of the material towards the raised regions of the tooth system.

The intersection of the diameter of the base of the annular groove with the V-shaped region of the recesses avoids the formation of a burr, so that subsequent deburring operations can be simplified.

It is understood that although the form of the invention shown herein and described constitutes the preferred embodiment of the invention, it is not intended to illustrate all possible forms thereof. It will also be understood that words used are words of description rather than a limitation, and that various changes may be made without departing from the spirit and scope of the invention as disclosed.

I claim:

1. An hydraulically actuated friction element for operating an automatic transmission, comprising:

a first drum member having a first system of teeth extending along the length of the drum member, each tooth spaced circumferentially from an adjacent tooth by a gap having a V-shaped recess bounded by surfaces inclined radially and circumferentially and located at a base of each gap, said recess extending longitudinally along the first drum member, having an annular groove intersecting each recess;

a securing ring located in said groove; and multiple discs, each disc having a tooth located in a gap and drivably engaged with the first system of teeth, each recess and a tooth of each disc defining a space therebetween, whereby a fluid medium can exit the first drum member longitudinally through said recesses.

2. The friction element of claim 1 wherein the drum member is formed in one-piece of cold-worked sheet metal.

3. The friction element of claim 1, further comprising:

a second drum member having a second tooth system facing the first tooth system, each tooth spaced circumferentially from an adjacent tooth;

the discs comprising a first disc set having a first tooth set engaged with the first tooth system, and second disc set arranged alternatingly with each of the discs of the first disc set, each disc of the second disc set having a second tooth set engaged with the second tooth system.

\* \* \* \* \*